United States Patent
Casillas et al.

(10) Patent No.: US 6,697,447 B1
(45) Date of Patent: Feb. 24, 2004

(54) MAXIMUM EXTENDED LOAD LINE LIMIT ANALYSIS FOR A BOILING WATER NUCLEAR REACTOR

(75) Inventors: Jose L. Casillas, Cupertino, CA (US); Eugene C. Eckert, Los Gatos, CA (US); Phuong T. Tran, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/475,592

(22) Filed: Dec. 30, 1999

(51) Int. Cl.$^7$ .............................................. G21C 17/00
(52) U.S. Cl. ...................... 376/245; 376/217; 376/219; 376/210
(58) Field of Search ................................ 376/245, 246, 376/217

(56) References Cited

U.S. PATENT DOCUMENTS

| | | |
|---|---|---|
| 5,200,139 A | 4/1993 | Mourlevat et al. |
| 5,293,411 A | 3/1994 | Miyamoto et al. |
| 5,524,128 A | 6/1996 | Mowry et al. |
| 5,528,639 A | 6/1996 | Eckert et al. |
| 5,953,238 A | 9/1999 | Mowry et al. |
| 6,198,786 B1 * | 3/2001 | Carroll et al. ............... 376/211 |

OTHER PUBLICATIONS

Bartos, "Pushing nuclear plants to their design power ratings," Power, May 1993, pp. 70–74.*
Legath, et al., "Power Uprating in Asea–Atom BWRs," Nuclear Europe, Mar. 1985, pp. 21–22.*
Sheranko, "Power Uprate Testing at PP&L's Susquehanna Units," Trans.Am. Nuclear Society, 1196, p. 321, vol. 74.*
Rogers, et al. , "Application of Design Margins for BWR Power Uprate," Trans. Am. Nuclear Society, 1985, p. 387, vol. 50.*
U.S. Nuclear Regulatory Commission, Appendix A to Part 50—General Design Criteria for Nuclear Power Plants, pp. 1–11.
U.S. Nuclear Regulatory Commission, Standard Review Plan for Review of License Renewal Application Nuclear Power Plants (NUREG–1800), pp. 1–170.

* cited by examiner

*Primary Examiner*—Michael J. Carone
*Assistant Examiner*—R Palabrica
(74) *Attorney, Agent, or Firm*—Armstrong Teasdale LLP

(57) ABSTRACT

A method for expanding the operating domain of a boiling water nuclear reactor that permits safe operation of the reactor at low core flows is described. The operating domain is characterized by a map of the reactor thermal power and core flow. In an exemplary embodiment, the method for expanding the operating domain of a boiling water nuclear reactor permits operation of the reactor between about 120 percent of rated thermal power and about 85 percent of rated core flow to about 100 percent of rated thermal power and about 55 percent of rated core flow. The method includes determining an elevated load line characteristic that improves reactor performance, performing safety evaluations at the elevated load line to determine compliance with safety design parameters, and performing operational evaluations at the elevated load line. The method also includes defining a set of operating conditions for the reactor in an upper operating domain characterized by the elevated load line. Additionally, the method includes performing a detailed analysis of the performance of the core recirculation system and the system control components. Further, the method provides for modifying the reactor process controls and computers to permit the reactor to operate in the expanded operating domain within predetermined safety parameters. Also, safety mitigation action setpoints are adjusted to permit reactor operation in the expanded operating domain.

21 Claims, 3 Drawing Sheets

MAXIMUM EXTENDED LOAD LINE LIMIT ANALYSIS FOR A BOILING WATER NUCLEAR REACTOR

BACKGROUND OF THE INVENTION

This invention relates generally to nuclear reactors and more particularly to a design analysis method that permits operation of a boiling water nuclear reactor in an expanded region of the power/core flow map.

A typical boiling water reactor (BWR) includes a pressure vessel containing a nuclear fuel core immersed in circulating coolant, i.e., water, which removes heat from the nuclear fuel. The water is boiled to generate steam for driving a steam turbine-generator for generating electric power. The steam is then condensed and the water is returned to the pressure vessel in a closed loop system. Piping circuits carry steam to the turbines and carry recirculated water or feedwater back to the pressure vessel that contains the nuclear fuel.

The BWR includes several conventional closed-loop control systems that control various individual operations of the BWR in response to demands. For example a control rod drive control system (CRDCS) controls the position of the control rods within the reactor core and thereby controls the rod density within the core which determines the reactivity therein, and which in turn determines the output power of the reactor core. A recirculation flow control system (RFCS) controls core flow rate, which changes the steam/water relationship in the core and can be used to change the output power of the reactor core. These two control systems work in conjunction with each other to control, at any given point in time, the output power of the reactor core. A turbine control system (TCS) controls steam flow from the BWR to the turbine based on pressure regulation or load demand.

The operation of these systems, as well as other BWR control systems, is controlled utilizing various monitoring parameters of the BWR. Some monitoring parameters include core flow and flow rate effected by the RFCS, reactor system pressure, which is the pressure of the steam discharged from the pressure vessel to the turbine that can be measured at the reactor dome or at the inlet to the turbine, neutron flux or core power, feedwater temperature and flow rate, steam flow rate provided to the turbine and various status indications of the BWR systems. Many monitoring parameters are measured directly, while others, such as core thermal power, are calculated-using measured parameters. Outputs from the sensors and calculated parameters are input to an emergency protection system to assure safe shutdown of the plant, isolating the reactor from the outside environment, if necessary, and preventing the reactor core from overheating during any emergency event.

To meet regulatory licensing guidelines, the thermal output of the reactor is limited as the percentage of maximum core flow decreases. A line characterized by this percent of thermal power output versus percent of core flow defines the upper boundary of the reactor safe operating domain. Some reactors have been licensed to operate with increased thermal power output (up-rated) with an upper boundary line characterized by the point of 100 percent original rated power and 75 percent of rated core flow. This upper boundary line constrains operation at the uprated power to a significantly smaller range of core flow and reduces flexibility during startup and at full power.

It would be desirable to provide a method of operating an up-rated boiling water nuclear reactor with a wider core flow operating range at full licensed power.

BRIEF SUMMARY OF THE INVENTION

A method for expanding the operating domain of a boiling water nuclear reactor that permits safe operation of the reactor at low core flows is described below. The operating domain is characterized by a map of the reactor thermal power and core flow. Typically, reactors are licensed to operate below the flow control/rod line characterized by the operating point defined by 100 percent of the original rated thermal power and 75 percent of rated core flow. In an exemplary embodiment, the method for expanding the operating domain of a boiling water nuclear reactor permits operation of the reactor between about 120 percent of rated thermal power and about 83 percent of rated core flow to about 100 percent of rated thermal power and about 55 percent of rated core flow.

The method for expanding the operating domain of a boiling water nuclear reactor includes, in one embodiment, determining an elevated load line characteristic that improves reactor performance, performing safety evaluations at the elevated load line to determine compliance with safety design parameters, and performing operational evaluations up to the elevated load line. The method also includes defining a set of operating conditions for the reactor in an upper operating domain characterized by the elevated load line.

Operational evaluations performed upto the elevated load line include, but are not limited to, evaluating plant maneuvers, frequent plant transients, plant fuel operating margins, operator training and plant equipment response and setpoints. Based on the results of the operational evaluations, constraints and requirements are established for plant equipment and procedures. Also, automatic adjustment of the control rod pattern, the flow controls, and the pressure controls based on the detection of a reactor transient is provided.

Additionally, the method includes performing a detailed analysis of the performance of the core recirculation system and the system control components. Further, the method provides for modifying the reactor process controls and computers to permit the reactor to operate in the expanded operating domain within predetermined safety parameters. Also, safety mitigation action setpoints are adjusted to permit reactor operation in the expanded operating domain.

The above described method provides analyzed limits that permit full power operation of the reactor at a core flow lower than 75 percent of rated core flow, which currently is the lowest permitted core flow for license approval. The lower than 75 percent core flow permits operation of the reactor over a larger core flow range and operating flexibility during startup and at full power. The method further provides savings in fuel cycle costs and faster plant startups due to the increased ability to establish desired full power control rod pattern at partial power conditions. The method still further provides a reduced cycle average recirculation pumping power consumption resulting in an increase in net station output.

DETAILED DESCRIPTION OF THE INVENTION

Figure 1:
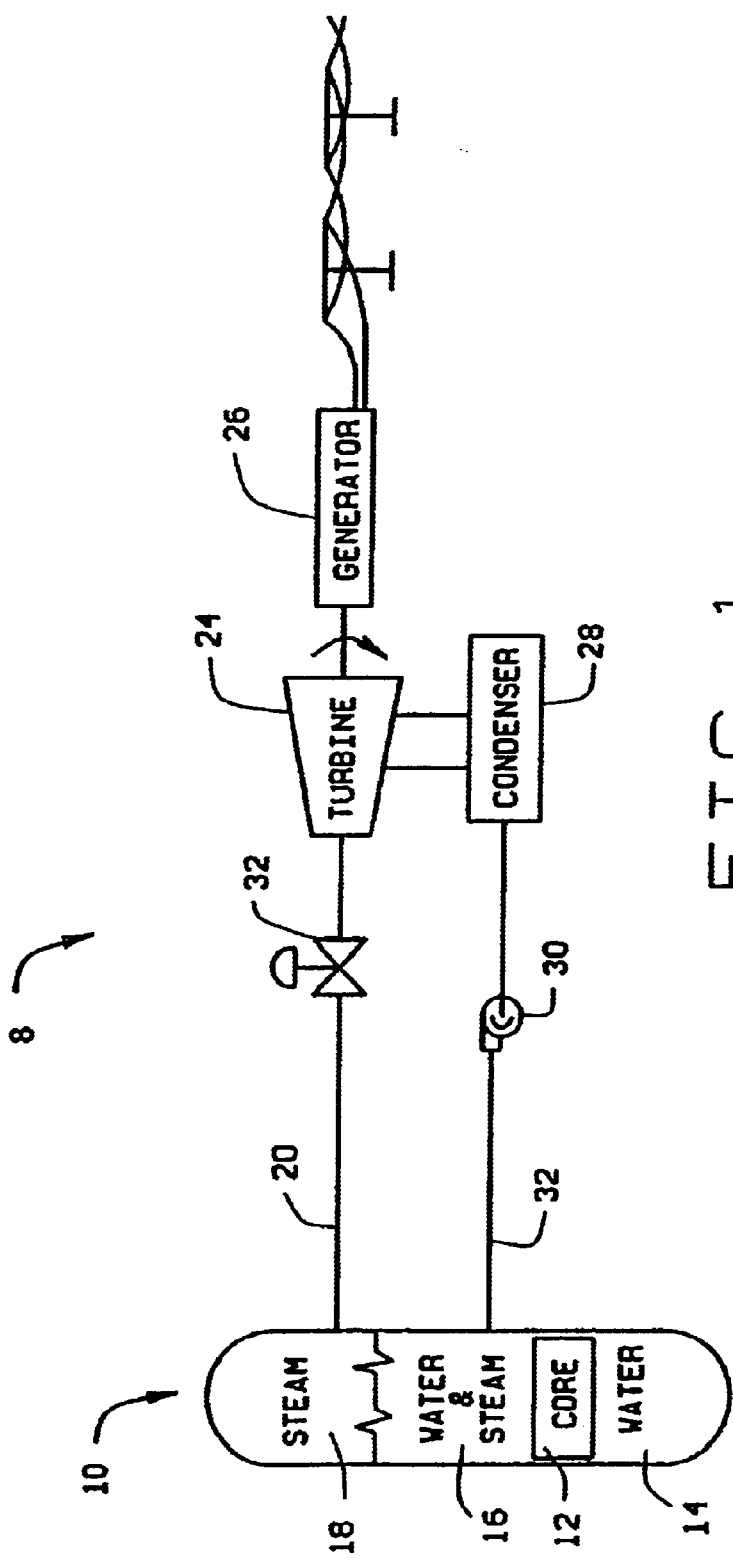
FIG. 1 is a schematic diagram of the basic components of a power generating system that contains a turbine-generator and a boiling water nuclear reactor.

FIG. 1 is a schematic diagram of the basic components of a power generating system 8. The system includes a boiling water nuclear reactor 10 which contains a reactor core 12. Water 14 is boiled using the thermal power of reactor core 12, passing through a water-steam phase 16 to become steam 18. Steam 18 flows through piping in a steam flow path 20 to a turbine flow control valve 22 which controls the amount of steam 18 entering steam turbine 24. Steam 18 is used to drive turbine 24 which in turn drives electric generator 26 creating electric power. Steam 18 flows to a condenser 28 where it is converted back to water 14. Water 14 is pumped by feedwater pump 30 through piping in a feedwater path 32 back to reactor 10.

Figure 2:
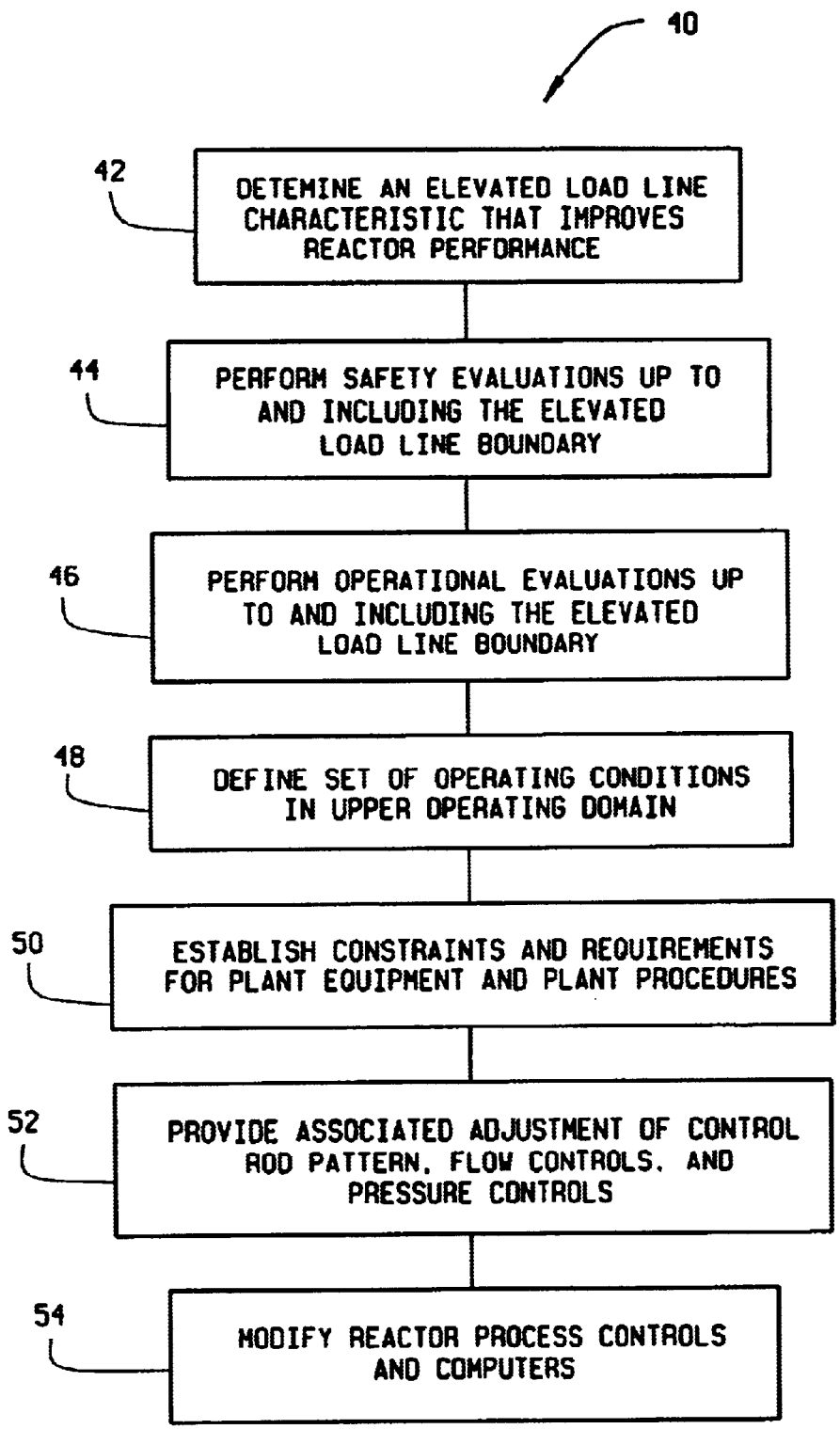
FIG. 2 is a flow chart of a method for expanding the operating domain of the boiling water nuclear reactor shown in FIG. 1 in accordance with an embodiment of the present invention.

FIG. 2 is a flow chart of a method 40 for expanding the operating domain of boiling water nuclear reactor 10. In one aspect, method 40 is applicable to boiling water nuclear reactor plants which can operate at higher than the original rated thermal power, where the fuel cycle performance at the higher load line is advantageous and plant performance at the higher power output is justified by appropriate safety analysis. In another aspect, method 40 provides the design concept and the analytical justification to operate boiling water nuclear reactor 10 in a significantly expanded region of the power/flow map. Method 40 includes the steps of determining an elevated load line characteristic that improves reactor performance 42, performing safety evaluations at the elevated load line to determine compliance with safety design parameters 44, and performing operational evaluations at the elevated load line 46. Method 40 also includes the step of defining a set of operating conditions for the reactor in an upper operating domain characterized by the elevated load line 48.

Based on the results of the operational evaluations of step 46, constraints and requirements are established for plant equipment and procedures 50. The optimum applicable range of the expanded region of operation is established. Also, automatic adjustment of the control rod pattern, the flow controls, and the pressure controls based on the detection of a reactor transient 52 is provided. Additionally, method 40 includes modification of the reactor process controls and computers to permit reactor operation in the upper operating domain 54.

To determine the desired elevated load line characteristic, evaluations at elevated core thermal power are performed. The desired load line increase is based on the thermal power increase and the fuel cycle performance improvement that is obtained at the elevated core thermal power. Calculations are performed to define the operating conditions of the reactor in the new operating region characterized by the elevated load line. Evaluations of the expected performance of the reactor throughout the new operating region are also performed.

Operational evaluations performed at the elevated load line include, but are not limited to, evaluating plant maneuvers, frequent plant transients, plant fuel operating margins, operator training and plant equipment response and setpoints. Based on the results of the operational evaluations, constraints and requirements are established for plant equipment and procedures.

Safety evaluations typically address the safety analysis Chapter 15 of the Final Safety Analysis Report (FSAR). Additionally, non-Chapter 15 safety issues such as containment integrity, stability and anticipated transient without scram (ATWS) are addressed. Safety analysis include demonstration of compatibility with the previous resolutions of reactor stability monitoring and mitigation of unplanned events. The safety evaluations are performed such that compliance to plant design criteria is demonstrated. Assurance of acceptable protection of the reactor and the public is performed and documented to satisfy regulatory authorities. A safety analysis report is generated to comply with regulatory requirements.

To maximize the ability of the boiling water reactor unit to avoid trip during transients that may occur while operating in the extended region, automatic adjustment of some controls is provided. For example automatic adjustment of the control rod pattern, flow controls and pressure controls based on sensing the initiation of a transient, such as a pump trip, are provided. These automatic controls improve plant availability, even in the previous range of reactor operation.

Figure 3:
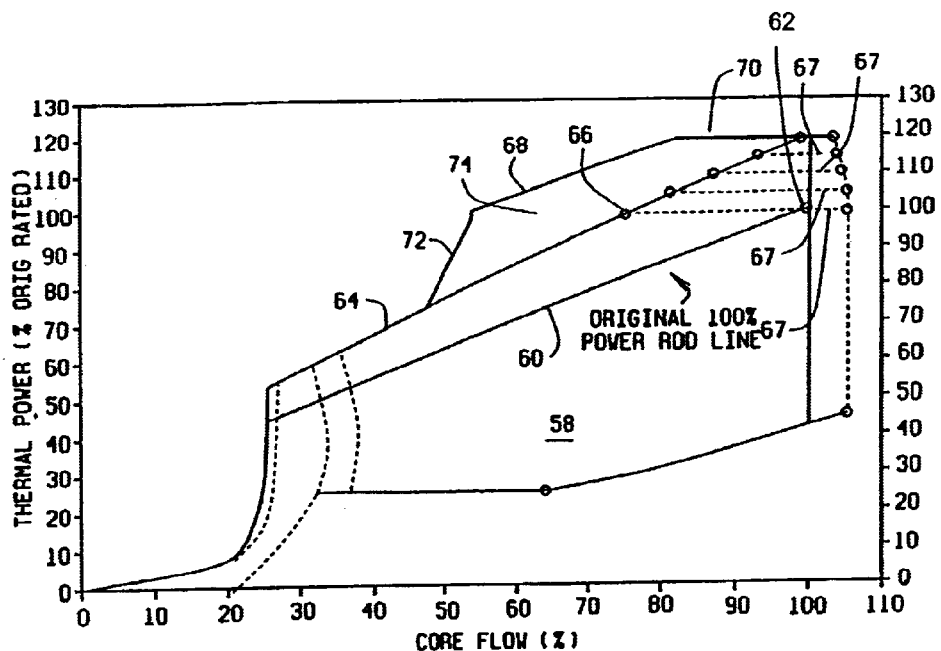
FIG. 3 is a graph of the percent of rated thermal power versus core flow illustrating an expanded operating domain of the boiling water reactor shown in FIG. 1.

An operating domain 58 of reactor 10 is characterized by a map of the reactor thermal power and core flow as illustrated in FIG. 3. Typically, reactors are licensed to operate below a flow control/rod line 60 characterized by an operating point 62 defined by 100 percent of the original rated thermal power and 100 percent of rated core flow. In some circumstances, reactors are licensed to operate with a larger domain, but are restricted to operation below a flow control/rod line 64 characterized by an operating point 66 defined by 100 percent of the original rated thermal power and 75 percent of rated core flow. Some reactors have been licensed to operate at higher power as illustrated by lines 67 in FIG. 3. However, these reactors are constrained by flow control/rod boundary line 64. In an exemplary embodiment of the present invention, method 40 expands operating domain 58 of reactor 10 and permits operation of reactor 10 between about 120 percent of original rated thermal power and about 85 percent of rated core flow to about 100 percent of original rated thermal power and about 55 percent of rated core flow. Lines 68, 70 and 72 represents this new upper boundary of an upper operating region 74 of operating domain 58 of reactor 10.

Figure 4:
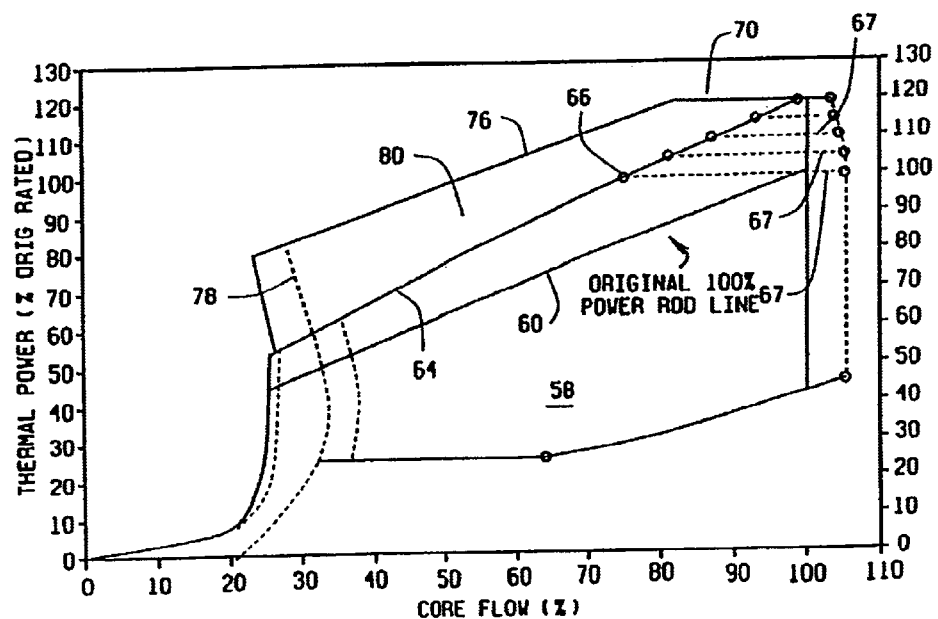
FIG. 4 is a graph of the percent of rated thermal power versus core flow illustrating another expanded operating domain of the boiling water reactor shown in Figure.

FIG. 4 shows another exemplary embodiment of the present invention where method 40 expands operating domain 58 of reactor 10 to an upper boundary represented by the operation of reactor 10 between about 120 percent of original rated thermal power and about 85 percent of rated core flow to about 60 percent of original rated thermal power and about 60 percent of rated core flow. Lines 70, 76 and 78 represents this new upper boundary of an expanded upper operating region 80 of operating domain 58 of reactor 10.

Method 40 provides analyzed limits that permit licensed power operation of reactor 10 at a core flow lower than the constraint on core flow imposed by boundary 64. The increased boundary line 68 permits operation of reactor 10 over a larger core flow range and operating flexibility during startup and at full power. Method 40 further provides savings in fuel cycle costs and faster plant startups due to the increased ability to establish desired full power control rod pattern at partial power conditions. Also provided is reduced cycle average recirculation pumping power consumption resulting in an increase in net station output.

Another embodiment of the invention includes providing analyses and evaluations to generate a safety analysis report as described above. Additionally, licensing support is provided to the owner, or managing entity, of the boiling water nuclear reactor, along with technical consultation during the implementation of reactor analyses and modifications described above.

While the invention has been described and illustrated in terms of various specific embodiments, those skilled in the art will recognize that the invention can be practiced with modification within the spirit and scope of the claims.

What is claimed is:

1. A method for expanding an operating domain of a boiling water nuclear reactor, the operating domain characterized by a map of the reactor thermal power and core flow, the reactor comprising a core having a control rod pattern, said method comprising the steps of:

determining an elevated load line characteristic that defines an upper boundary line of the operating domain, the upper boundary line comprising a first endpoint of about 120 percent rated thermal power at about 85 percent core flow and a second endpoint of about 100 percent rated thermal power at about 55 percent rated core flow;

performing safety evaluations at the elevated load line to determine compliance with safety design parameters; and performing operational evaluations at the elevated load line.

2. A method in accordance with claim 1 wherein determining an elevated load line characteristic that improves reactor performance comprises the steps of increasing reactor thermal power to increase load line and evaluating reactor performance.

3. A method in accordance with claim 1 wherein increasing reactor thermal power to increase load line comprises the step of adjusting a control rod pattern to increase reactor thermal power.

4. A method in accordance with claim 1 wherein increasing reactor thermal power to increase load line comprises the step of adjusting the core flow to increase reactor thermal power.

5. A method in accordance with claim 1 wherein increasing reactor thermal power to increase load line comprises the step of adjusting a control rod pattern and adjusting the core flow to increase reactor thermal power.

6. A method in accordance with claim 2 further comprising the step of defining a set of operating conditions for the reactor in an upper operating domain characterized by the elevated load line.

7. A method in accordance with claim 1 wherein performing operational evaluations at the elevated load line comprises the steps of:

evaluating plant maneuvers;
   evaluating frequent plant transients;
   evaluating plant fuel operating margins;
   evaluating operator training;
   evaluating plant equipment response and setpoints.

8. A method in accordance with claim 7 further comprising the step of establishing constraints and requirements for plant equipment and plant procedures based on the operational evaluations.

9. A method in accordance with claim 7 wherein the reactor further comprises a core recirculation system comprising control components, said method further comprising the steps of performing a detailed analysis of the performance of the core recirculation system and performing a detailed analysis of the core recirculation system control components.

10. A method in accordance with claim 8 wherein the reactor further comprises flow controls and pressure controls, said method further comprising the steps of providing automatic adjustment of the control rod pattern, flow controls, and the pressure controls based on a detection of a reactor transient.

11. A method in accordance with claim 8 wherein the reactor further comprises process controls and computers, said method further comprising the steps of modifying the reactor process controls and computers to permit the reactor to operate in the expanded operating domain within predetermined safety parameters.

12. A method in accordance with claim 1 further comprising the step of creating a safety analysis report based on the safety evaluations.

13. A method for expanding an operating domain of a boiling water nuclear reactor, the operating domain characterized by a map of the reactor thermal power and core flow, the reactor comprising a core having a control rod pattern, said method comprising the steps of:

determining an elevated load line characteristic that defines an upper boundary line of the operating domain, the upper boundary line comprising a first endpoint of about 120 percent rated thermal power at about 85 percent core flow and a second endpoint of about 100 percent rated thermal power at about 55 percent rated core flow by increasing reactor thermal power to increase load line and evaluating reactor performance;

defining a set of operating conditions for the reactor in an upper operating domain characterized by the elevated load line;

performing safety evaluations at the elevated load line to determine compliance with safety design parameters;

performing operational evaluations at the elevated load line; and creating a safety analysis report based on the safety evaluations.

14. A method in accordance with claim 13 wherein increasing reactor thermal power to increase load line comprises the step of adjusting the control rod pattern to increase reactor thermal power.

15. A method in accordance with claim 13 wherein increasing reactor thermal power to increase load line comprises the step of adjusting the core flow to increase reactor thermal power.

16. A method in accordance with claim 15 wherein increasing reactor thermal power to increase load line comprises the step of adjusting the control rod pattern and adjusting the core flow to increase reactor thermal power.

17. A method in accordance with claim 13 wherein performing operational evaluations at the elevated load line comprises the steps of:

evaluating plant maneuvers;
   evaluating frequent plant transients;
   evaluating plant fuel operating margins;
   evaluating operator training;
   evaluating plant equipment response and setpoints.

18. A method in accordance with claim 17 further comprising the step of establishing constraints and requirements for plant equipment and plant procedures based on the operational evaluations.

19. A method in accordance with claim 17 wherein the reactor further comprises a core recirculation system comprising control components, said method further comprising the steps of performing a detailed analysis of the performance of the core recirculation system and performing a detailed analysis of the core recirculation system control components.

20. A method in accordance with claim 17 wherein the reactor further comprises flow controls and pressure controls, said method further comprising the steps of providing automatic adjustment of the control rod pattern, flow controls, and the pressure controls based on a detection of a reactor transient.

21. A method in accordance with claim 18 wherein the reactor further comprises process controls and computers, said method further comprising the steps of modifying the reactor process controls and computers to permit the reactor to operate in the expanded operating domain within predetermined safety parameters.

* * * * *